US010440268B2

(12) United States Patent
Lo et al.

(10) Patent No.: US 10,440,268 B2
(45) Date of Patent: Oct. 8, 2019

(54) IMAGE CAPTURING DEVICE HAVING POWER RESET FUNCTION

(71) Applicant: Chicony Electronics Co., Ltd., New Taipei (TW)

(72) Inventors: Kuo-Cheng Lo, New Taipei (TW); Tzu-Yu Lin, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 4 days.

(21) Appl. No.: 15/959,680

(22) Filed: Apr. 23, 2018

(65) Prior Publication Data
US 2019/0141241 A1 May 9, 2019

(30) Foreign Application Priority Data

Nov. 8, 2017 (TW) .............................. 106138693 A

(51) Int. Cl.
H04N 5/225 (2006.01)
H04N 5/232 (2006.01)
(Continued)

(52) U.S. Cl.
CPC ..... H04N 5/23241 (2013.01); H04N 1/00885 (2013.01); H04N 5/2252 (2013.01); H04N 5/3698 (2013.01); G03B 2217/002 (2013.01)

(58) Field of Classification Search
CPC .. H04N 5/225; H04N 5/2252; H04N 5/22521; H04N 5/23241; H04N 5/3698; H04N 1/00885; G03B 2217/002
See application file for complete search history.

(56) References Cited

U.S. PATENT DOCUMENTS 6,154,675 A * 11/2000 Juran .................. A61N 1/3708
607/27
7,170,560 B2 * 1/2007 Tatewaki ......... G08B 13/19619
348/151
(Continued)

FOREIGN PATENT DOCUMENTS

TW 201127055 A 8/2011
TW 201713376 A 4/2017

OTHER PUBLICATIONS

Office Action issued in corresponding Taiwan patent application dated Oct. 8, 2018.

Primary Examiner — Ngoc Yen T Vu
(74) Attorney, Agent, or Firm — Muncy, Geissler, Olds & Lowe, PC

(57) ABSTRACT

An image capturing device having a power reset function includes a fixed base and a camera. The fixed base has a first assembly portion, and the first assembly portion is provided with a first magnetic member. The camera includes a housing, a circuit board, and a magnetic reset switch electrically connected to the circuit board. The housing has a second assembly portion, and the second assembly portion is provided with a second magnetic member. The second magnetic member and the first magnetic member are configured to be magnetically attracted to each other such that the second assembly portion is correspondingly assembled and disposed on the first assembly portion. The circuit board is disposed inside the housing. The magnetic reset switch is disposed inside the housing and is distant from the second assembly portion.

13 Claims, 9 Drawing Sheets

(51) Int. Cl.
*H04N 1/00* (2006.01)
*H04N 5/369* (2011.01)

(56) References Cited

U.S. PATENT DOCUMENTS

| | | | |
|---|---|---|---|
| 9,678,547 B1* | 6/2017 | Mirov | G06F 1/24 |
| 2012/0099392 A1* | 4/2012 | Shim | G11C 16/30 |
| | | | 365/226 |
| 2014/0035634 A1* | 2/2014 | Shrivastava | G01R 21/00 |
| | | | 327/143 |

* cited by examiner

IMAGE CAPTURING DEVICE HAVING
POWER RESET FUNCTION

CROSS-REFERENCE TO RELATED
APPLICATION

This non-provisional application claims priority under 35 U.S.C. § 119(a) to Patent Application No. 106138693 filed in Taiwan, R.O.C. on Nov. 8, 2017, the entire contents of which are hereby incorporated by reference.

BACKGROUND

Technical Field

The present invention relates to an electronic device, and in particular, to an image capturing device having a power reset function.

Related Art

Generally, electronic devices (for example, surveillance cameras, routers, or digital assistant devices) each have a power reset function. When an electronic device cannot normally operate or is down, the electronic device may be restored to a normal operating state by restarting a power source. Currently, there are mainly several methods for restarting a power source of an electronic device, as follows.

A first method is that a housing of the electronic device is dismantled, and a battery is taken out and then is reinstalled, to restart the power source. However, this manner cannot be applicable to a sealed electronic device (for example, an electronic device that is entirely waterproof). In addition, each time the power source needs to be restarted, the housing needs to be dismantled, resulting in consumption of working hours and manpower, and easy damage to the housing.

A second method is that the housing is provided with a hole, a position that is inside the housing and that corresponds to the hole is provided with a key reset switch, and a user may correspondingly press the reset switch by using a needle through the hole, to restart the power source. However, this method is not applicable to the sealed electronic device either. In addition, a shape of the hole on the housing is mostly similar to that of another hole (for example, a noise reduction hole or a microphone hole). Consequently, the user is likely to incorrectly insert the needle into the another hole, resulting in damage to a part or a loss of a waterproof function.

SUMMARY

In view of this, in an embodiment, the present invention provides an image capturing device having a power reset function, including a fixed base and a camera. The fixed base has a first assembly portion, and the first assembly portion is provided with a first magnetic member. The camera includes a housing, a circuit board, and a magnetic reset switch electrically connected to the circuit board. The housing has a second assembly portion, and the second assembly portion is provided with a second magnetic member. The second magnetic member and the first magnetic member are configured to be magnetically attracted to each other such that the second assembly portion is correspondingly assembled and disposed on the first assembly portion. The circuit board is disposed inside the housing. The magnetic reset switch is disposed inside the housing and is distant from the second assembly portion.

Based on the above, when the image capturing device in the embodiments of the present invention cannot normally operate or is in a state in which no response is given (a crash or hang), the camera may be moved, to make the magnetic reset switch approach the first magnetic member of the fixed base, or an external magnetic object is used to approach the magnetic reset switch, so that the magnetic reset switch senses magnetism to perform power reset. The housing does not need to be dismantled, or a hole does not need to be formed on the housing, thereby avoiding damage to a part or a function of a product and improving the power reset efficiency, and the power reset method may be applicable to a sealed image capturing device.

DETAILED DESCRIPTION

Figure 1:
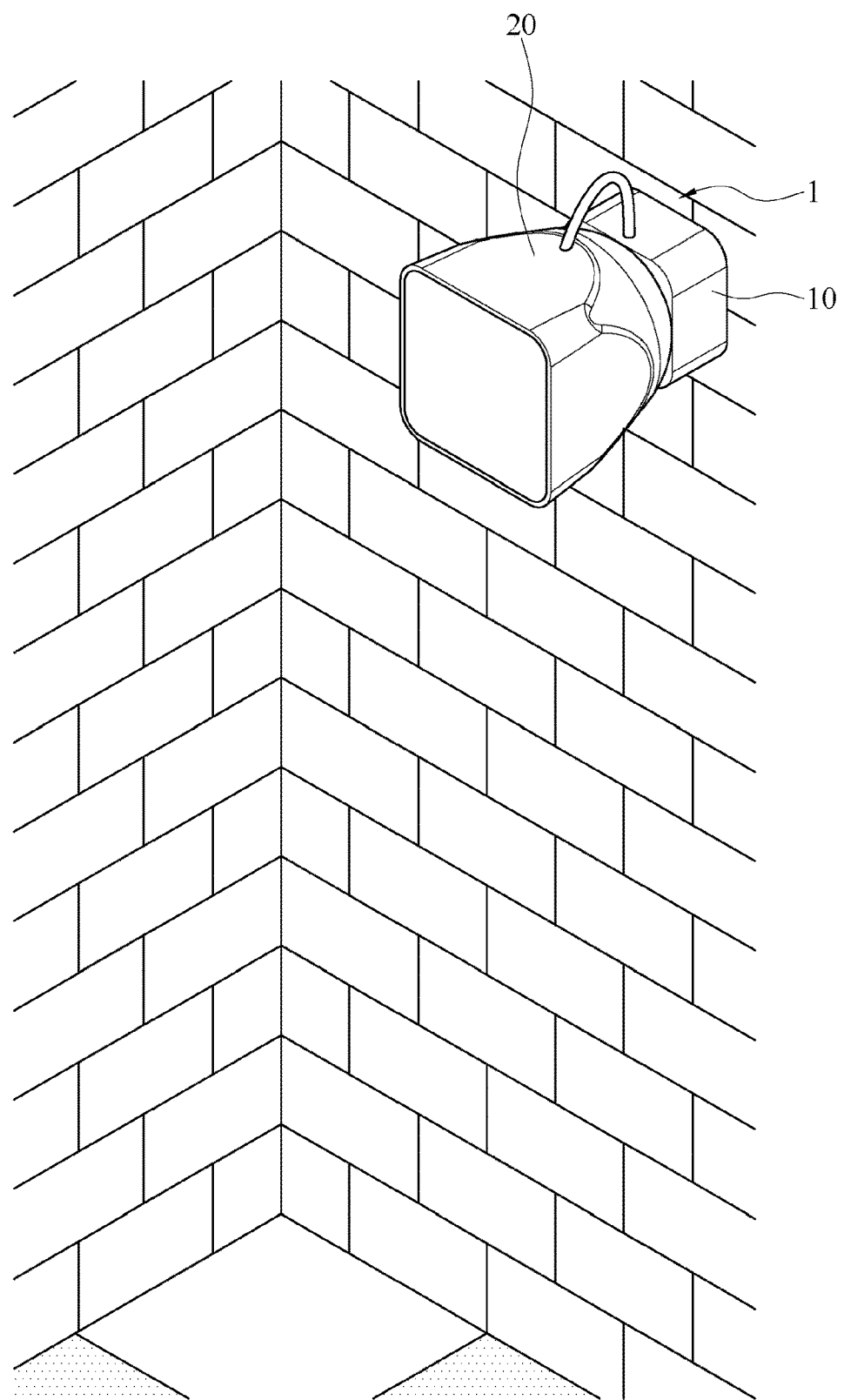
FIG. 1 is a perspective view of an image capturing device according to a first embodiment of the present invention.
Figure 2:
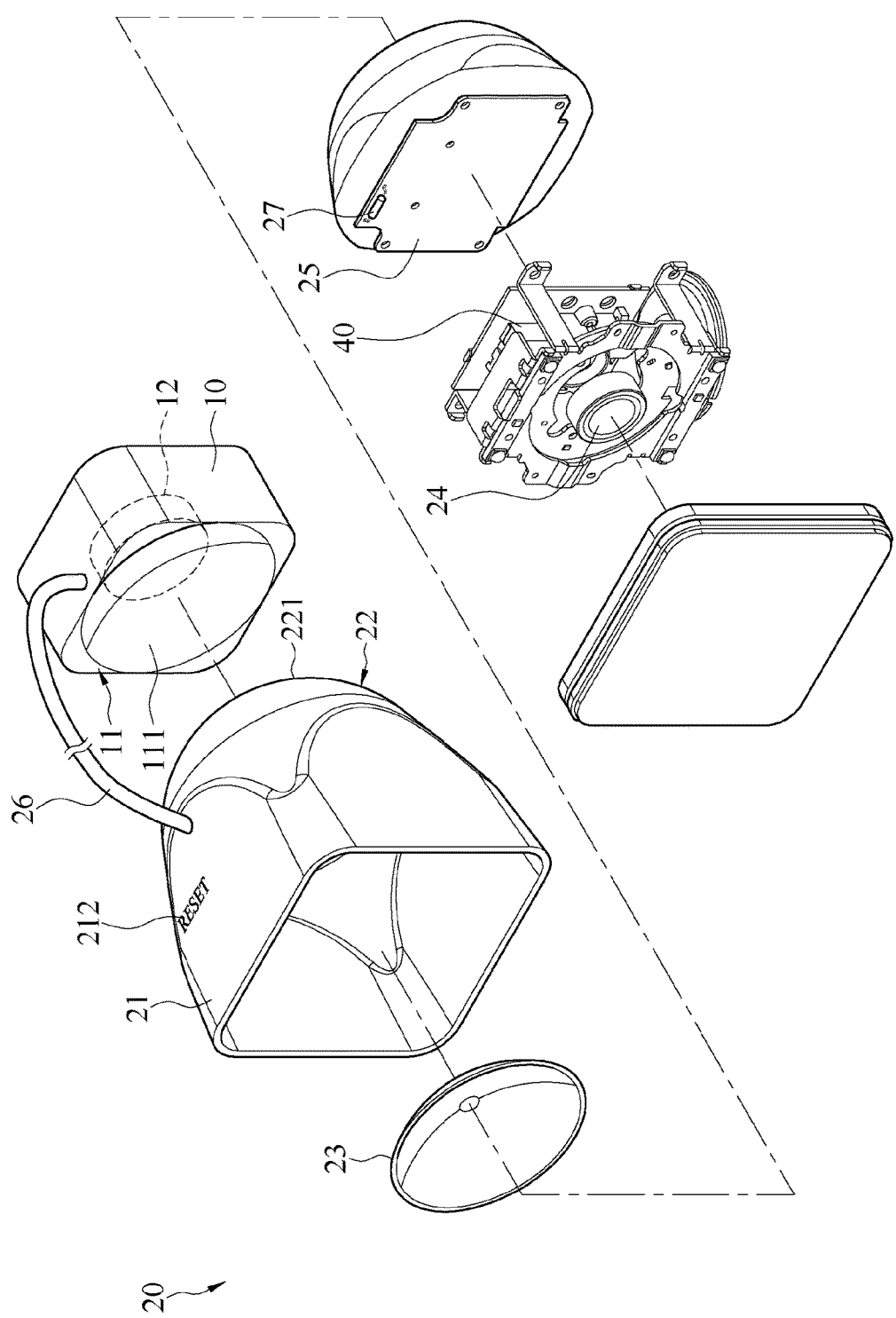
FIG. 2 is an exploded view of the image capturing device according to the first embodiment of the present invention.

FIG. 1 is a perspective view of an image capturing device according to a first embodiment of the present invention, and FIG. 2 is an exploded view of the image capturing device according to the first embodiment of the present invention. As shown in FIG. 1 and FIG. 2, the present invention provides an image capturing device 1 having a power reset function, including a fixed base 10 and a camera 20. As shown in FIG. 1, in this embodiment, the image capturing device 1 is, for example, an image monitoring camera. Specifically, the image capturing device 1 may be an IP camera/network camera, a closed-circuit television (CCTV) camera, or an analog surveillance camera. The image capturing device 1 may be installed in various places (for example, a nursery, an office, a shop, and a road), to perform security monitoring or record human activities. In addition to the foregoing embodiment, in different embodiments, the image capturing device 1 may alternatively be a webcam that is usually connected to a computer to perform a video call, or an event data recorder that is installed on a vehicle, or the like.

Figure 3:
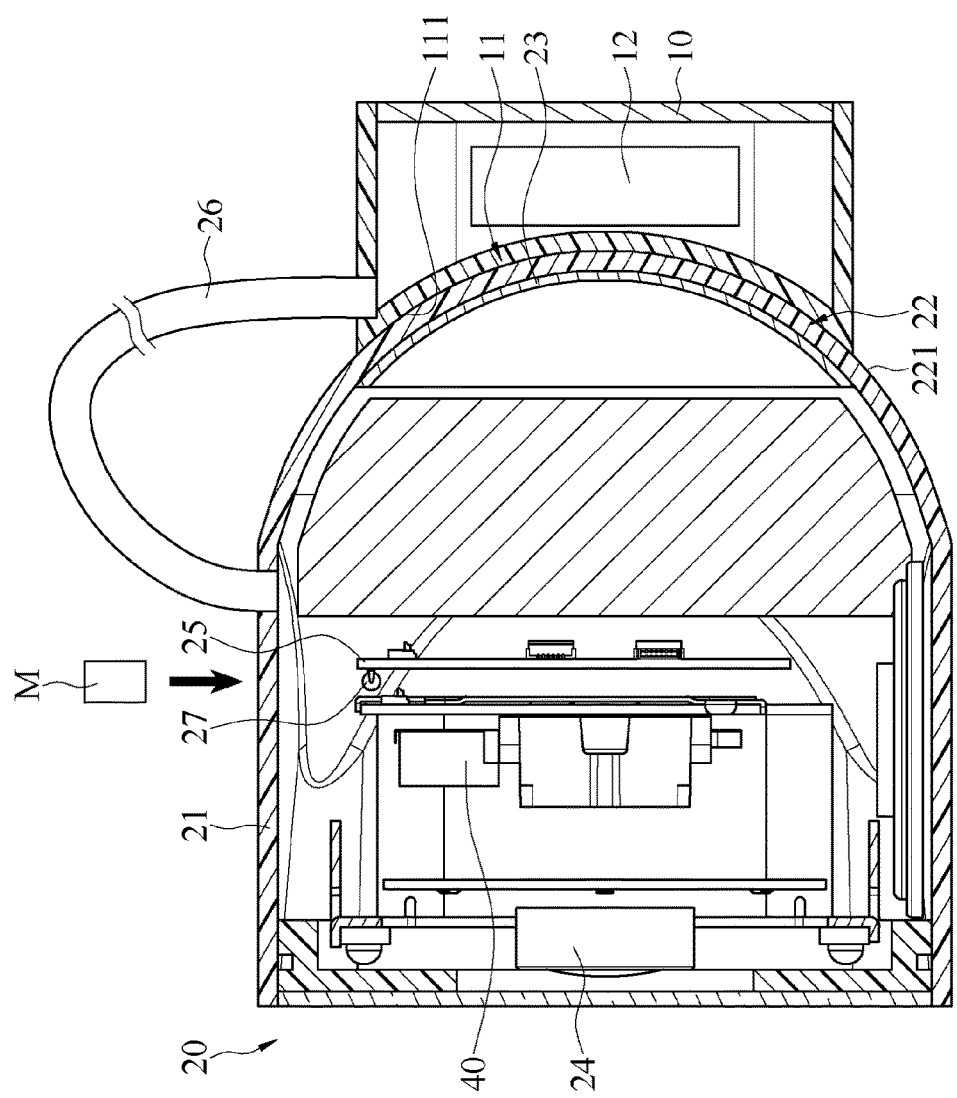
FIG. 3 is a sectional view of the image capturing device according to the first embodiment of the present invention.

In an embodiment, the fixed base 10 of the image capturing device 1 may be assembled on a fixed object. For example, as shown in FIG. 1, in this embodiment, the fixed base 10 is fixed on a wall. Practically, the fixed base 10 may be fixed on various places (for example, a ceiling, a street lamp, a utility pole, and a dashboard) according to usage scenarios. The fixed base 10 has a first assembly portion 11 configured to assemble the camera 20. Referring to FIG. 2 and FIG. 3, FIG. 3 is a sectional view of the image capturing device according to the first embodiment of the present invention. In this embodiment, the fixed base 10 is in the form of a housing, the first assembly portion 11 is a side face that is of the fixed base 10 and that is configured to be assembled to the camera 20, and the first assembly portion 11 is provided with a first magnetic member 12. In this embodiment as shown in the figures, the first magnetic member 12 is disposed inside the fixed base 10 and approximal to the first assembly portion 11. In another embodiment, the first magnetic member 12 may alternatively be directly fixed on an inner surface or an outer surface of the first assembly portion 11. In an embodiment, the first magnetic member 12 may be a magnet, for example, a round magnet, a bar magnet, a U-shaped magnet, a ring magnet, or a magnet of another shape; the present disclosure is not limited thereto.

As shown in FIG. 2 and FIG. 3, the camera 20 includes a housing 21, a circuit board 25, and a magnetic reset switch 27 electrically connected to the circuit board 25, and the housing 21 has a second assembly portion 22 configured to be assembled to the fixed base 10. In this embodiment, the housing 21 is in the form of a hollow housing, the circuit board 25 is disposed inside the housing 21, and the magnetic reset switch 27 is disposed on the circuit board 25. In addition, the circuit board 25 is electrically connected to a power source 40, and the power source 40 may be disposed inside or outside the housing 21. For example, in the embodiment as shown in FIG. 3, the power source 40 includes a battery disposed inside the housing 21, to supply electric power required by the camera 20. Alternatively, the power source 40 may include a battery, mains, or other supply unit disposed outside the housing 21, and the external power source 40 may supply, by means of a wire connection to the circuit board 25, electric power required by the camera 20. The camera 20 may have a lens 24 that is electrically connected to the circuit board 25 to capture an external image. The second assembly portion 22 is a side face that is of the housing 21 and that is configured to be assembled to the fixed base 10. In this case, the lens 24 and the second assembly portion 22 are respectively located on opposite sides of the camera 20, for example, respectively located on a front side and a rear side of the camera 20.

As mentioned above, in an embodiment, the second assembly portion 22 of the housing 21 is provided with a second magnetic member 23. For example, in the embodiment shown in FIG. 3, the second magnetic member 23 is disposed inside the housing 21 and is approximal to an inner surface of the second assembly portion 22. Alternatively, the second magnetic member 23 may be disposed on an outer surface of the second assembly portion 22, and the present disclosure is not limited thereto. The second magnetic member 23 may be a magnet or a ferromagnetic member (for example, iron, nickel, cobalt, or other metal members) that can generate a magnetic attraction force with the first magnetic member 12 when the second magnetic member 23 approaches the first magnetic member 12.

For example, as shown in FIG. 3, the first magnetic member 12 and the second magnetic member 23 are both magnets and each have an N pole and an S pole, the N pole of the first magnetic member 12 is approximal to the housing 21 relative to the S pole thereof, and the S pole of the second magnetic member 23 is approximal to the fixed base 10 relative to the N pole thereof, so that a magnetic attraction force can be generated when the first magnetic member 12 and the second magnetic member 23 approach each other. In another embodiment, the second magnetic member 23 is a ferromagnetic member, and the first magnetic member 12 is a magnet, when the first magnetic member 12 and the second magnetic member 23 approach each other, the second magnetic member 23 is magnetized, thereby forming opposite polarities to generate a magnetic attraction force.

As shown in FIG. 2 and FIG. 3, the second magnetic member 23 and the first magnetic member 12 are configured to be magnetically attracted to each other such that the second assembly portion 22 is correspondingly assembled and disposed on the first assembly portion 11. In this way, the camera 20 may be easily disassembled from the fixed base 10 and move separately. For example, a user may apply a force to separate the second magnetic member 23 from the first magnetic member 12, to remove the camera 20 from the fixed base 10, thereby achieving advantages of easy and fast disassembly and assembly, and convenient repairs.

In an embodiment, the first assembly portion 11 of the fixed base 10 and the second assembly portion 22 of the camera 20 are of corresponding shapes. For example, in the embodiment shown in FIG. 3, the first assembly portion 11 of the fixed base 10 has a spherical concave 111, and the second assembly portion 22 of the housing 21 has a spherical convex 221 corresponding to the spherical concave 111. When the second magnetic member 23 and the first magnetic member 12 are magnetically attracted to each other, the spherical convex 221 is correspondingly accommodated and disposed in the spherical concave 111 and can be rotated relative to the spherical concave 111 while being accommodated and disposed therein, so that the camera 20 can be rotated relative to the fixed base 10 to adjust a shooting angle, and a direction of a central axis of the camera 20 can be changed along various planes. However, the above implementation is merely an exemplary embodiment. In alternative embodiments, the first assembly portion 11 and the second assembly portion 22 may be a square groove and a square projection that correspond to each other, or the first assembly portion 11 and the second assembly portion 22 may be flat surfaces that correspond to each other.

Referring to FIG. 3, in an embodiment, a section of the second magnetic member 23 is of a circular arc shape, and the second magnetic member 23 is correspondingly attached to the spherical convex 221, so that in a process of rotating the spherical convex 221 relative to the spherical concave 111, the second magnetic member 23 can be continuously attracted to the first magnetic member 12, thereby preventing the camera 20 from falling off.

In an embodiment, the magnetic reset switch 27 of the camera 20 is disposed inside the housing 21 and is distant from the second assembly portion 22. That is, when the fixed base 10 and the camera 20 are assembled to each other, the magnetic reset switch 27 is outside the ranges of the magnetic fields created by the first magnetic member 12 or the second magnetic member 23, is free from influence of the magnetic fields created by the first magnetic member 12 or the second magnetic member 23, and does not sense magnetism. For example, in the embodiment shown in FIG. 3, the magnetic reset switch 27 is disposed between the lens 24 and the second assembly portion 22 and is approximal to a surface of the housing 21, such that the magnetic reset switch 27 is distant from the first magnetic member 12 and the second magnetic member 23. In alternative embodiments, the magnetic reset switch 27 may be disposed on a side that is of the housing 21 and that is approximal to the lens 24, such that the magnetic reset switch 27 and the second assembly portion 22 are respectively located on opposite sides of the housing 21, and therefore is more distant from the first magnetic member 12 and the second magnetic member 23.

Specifically, the magnetic reset switch 27 is a power reset switch. When the magnetic reset switch 27 approaches a magnetic object and senses magnetism, the magnetic reset switch 27 may drive the supply of the power source to be restarted after power off, to implement the power reset function, so that an electronic element may be initialized again for a configuration parameter thereof, or that an electronic device is restored from a state in which no response is given (a crash or hang) to a normal state, and so on. For example, the magnetic reset switch 27 may generate a sensing signal (for example, a pulse signal or a voltage level signal) when sensing magnetism, and the circuit board 25 correspondingly according to the generated sensing signal drives the supply of the power source to be restarted after power off.

In some embodiments, the camera 20 may have different power reset means according to different configurations of the power source 40. For example, in the embodiment shown in FIG. 3, the power source 40 includes the battery disposed inside the housing 21. When the magnetic reset switch 27 approaches a magnetic object and senses magnetism, the circuit board 25 may cut off and then recover the supply of the power source 40, to implement the power reset function. In alternative embodiments, the power source 40 may include the battery, the mains, or the other power supply unit disposed outside the housing 21; when the magnetic reset switch 27 approaches a magnetic object and senses magnetism, the circuit board 25 may cut off and then recover electric power transmitted from the external power source 40 through a wire; or when the magnetic reset switch 27 approaches a magnetic object and senses magnetism, the circuit board 25 may output a signal to the external power source 40, so that the external power source 40 is cuts off and then recovered, to implement the power reset function.

Figure 4:
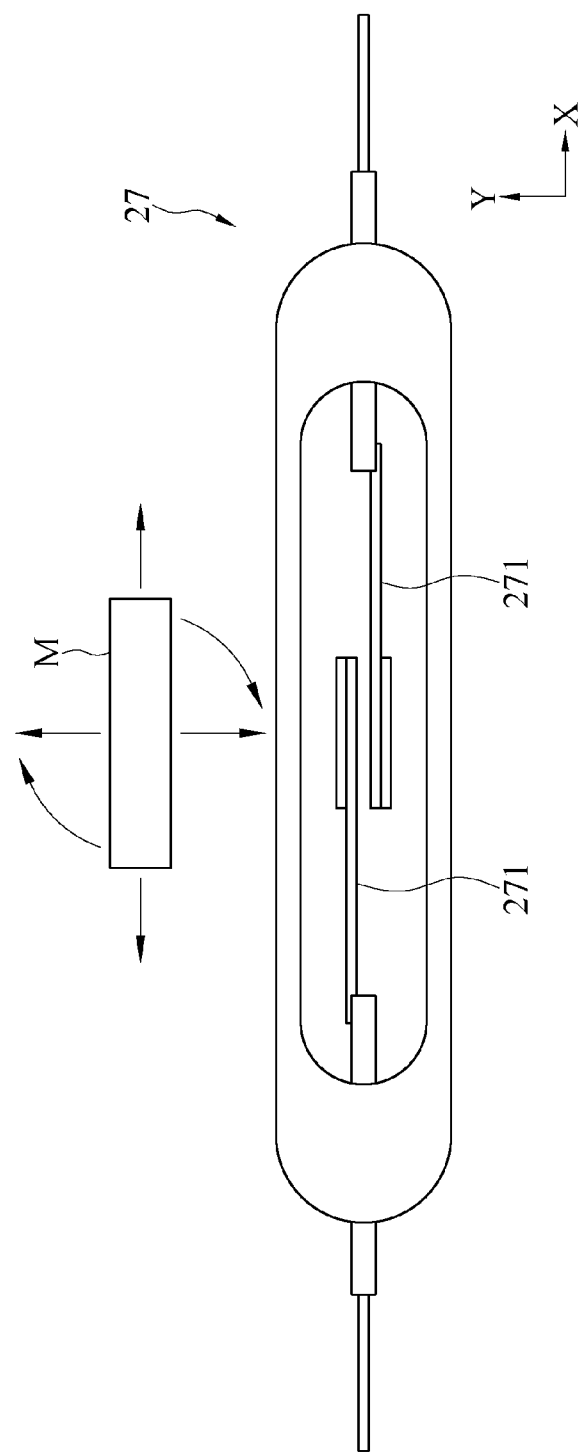
FIG. 4 is a plan view of a magnetic reset switch according to an embodiment of the present invention.

In an embodiment, the magnetic reset switch 27 may be a reed switch. As shown in FIG. 4, which is a plan view of a magnetic reset switch according to an embodiment of the present invention, in this embodiment, the reed switch has two magnetic reeds 271. Specifically, the two magnetic reeds 271 may be magnetizable reeds (for example, made of a magnet material such as iron, nickel, or cobalt). In addition, ends of the two magnetic reeds 271 are sealed in a body, and a gap remains between the two ends of the magnetic reeds 271. When a magnetic object M (for example, a magnet) approaches the reed switch, under the effect of the magnetic field, which can be mapped to form magnetic lines, the two magnetic reeds 271 are magnetized, to attract each other, and come into contact and conduction with each other, so as to trigger power reset. When the magnetic object M moves away there from, the effect of the magnetic field disappears, so that the two magnetic reeds 271 are separated due to their elasticity, to make the power source maintain a power supply state.

Alternatively, in another embodiment, the magnetic reset switch 27 may be a magnetic induction switch. When the magnetic object M approaches the magnetic induction switch, under the effect of the magnetic field, the magnetic induction switch generates a sensed pulse signal, to correspondingly perform power reset. When the magnetic object M moves away there from, the power source maintains the power supply state.

Figure 5:
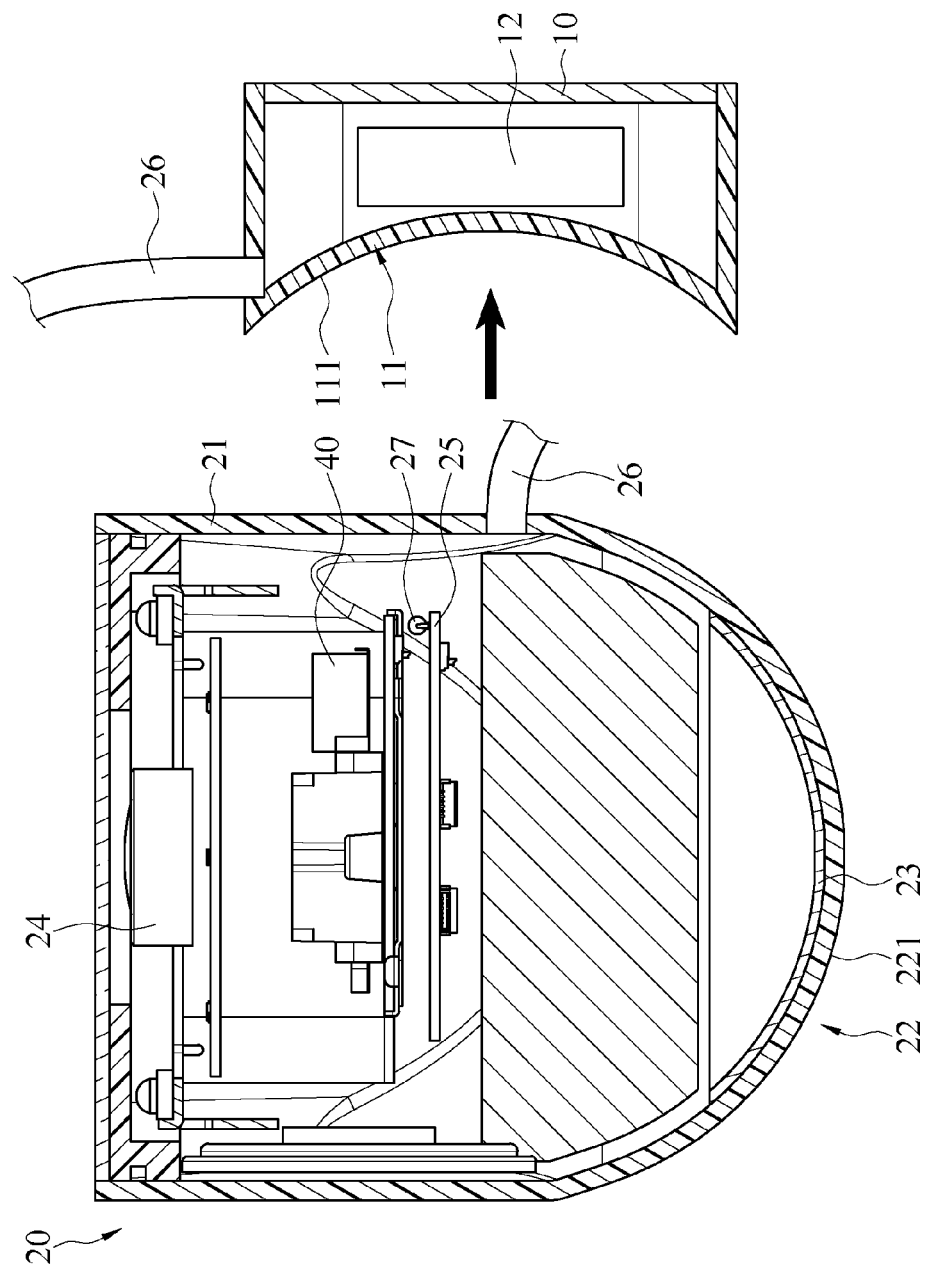
FIG. 5 is a sectional view of the image capturing device in use for power reset according to an embodiment of the present invention.
Figure 6:
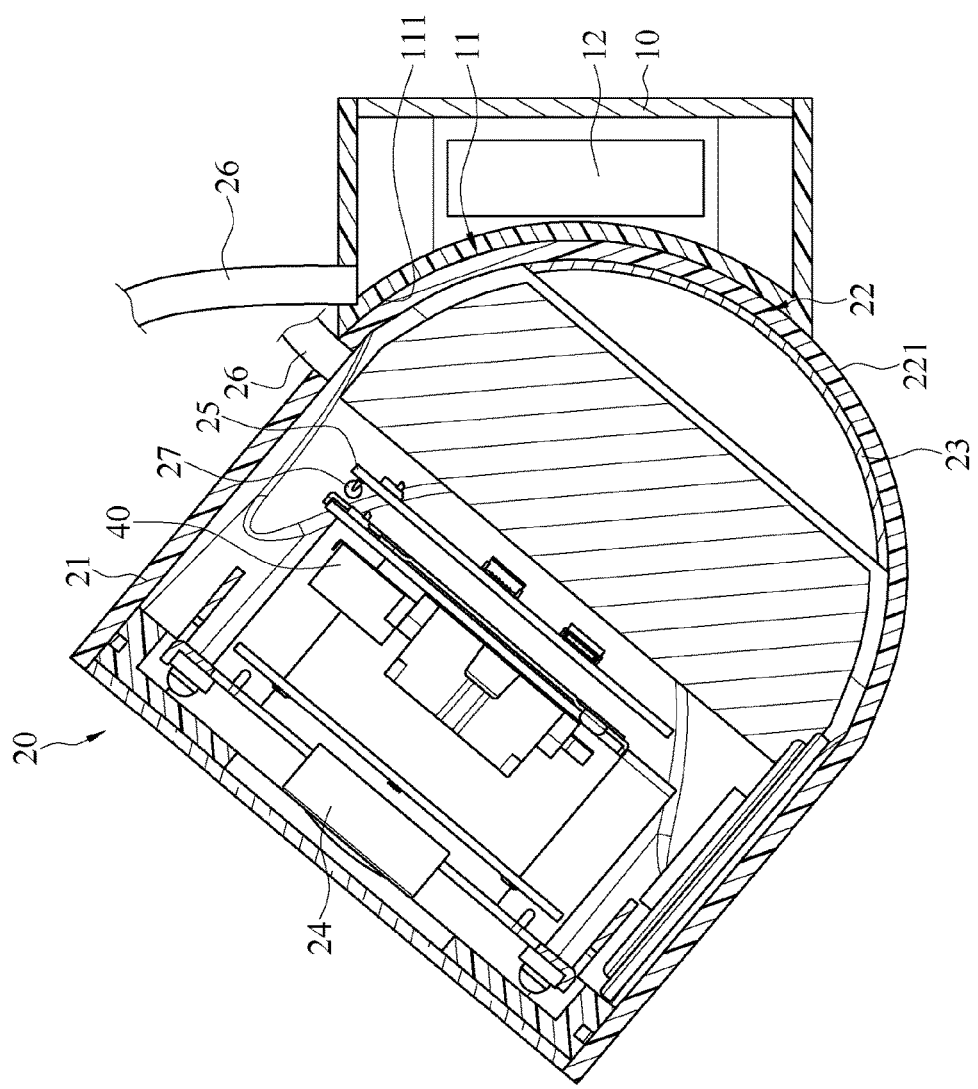
FIG. 6 is a sectional view of the image capturing device in use for angle adjustment according to an embodiment of the present invention.

Accordingly, when power reset is required because the image capturing device 1 cannot normally operate or gives no response, the camera 20 can be moved to make the magnetic reset switch 27 approach the first magnetic member 12 of the fixed base 10, so that the magnetic reset switch 27 enters a range of a magnetic field of the first magnetic member 12 and senses magnetism, to perform power reset. For example, in an embodiment shown in FIG. 5, which is a sectional view of the image capturing device in use for power reset according to an embodiment of the present invention, the user may apply a force to separate the second magnetic member 23 from the first magnetic member 12, to remove the camera 20 from the fixed base 10, then rotate the camera 20 to make the magnetic reset switch 27 correspond to the first magnetic member 12, and subsequently, move the camera 20 to approach the first magnetic member 12, so that the magnetic reset switch 27 enters the range of the magnetic field of the first magnetic member 12, and the magnetic reset switch 27 may sense the magnetism, to perform power reset. Alternatively, in another embodiment, as shown in FIG. 6, which is a sectional view of the image capturing device in use for angle adjustment according to an embodiment of the present invention, when the fixed base 10 and the camera 20 are in an assembled state, the user may control the camera 20 to rotate relative to the fixed base 10, to make the magnetic reset switch 27 approach the first magnetic member 12, to sense the magnetism and perform power reset. A size of the range of the magnetic field of the first magnetic member 12 may be determined according to a magnetic field intensity of the first magnetic member 12. Generally, a higher magnetic field intensity of the first magnetic member 12 indicates a larger range of the magnetic field.

In addition, the user may alternatively use an external magnetic object to approach the magnetic reset switch 27, to make the magnetic reset switch 27 sense magnetism and perform power reset. For example, as shown in FIG. 3, the user may use the external magnetic object M (for example, the magnet) carried by the user to approach the magnetic reset switch 27, to make the magnetic reset switch 27 perform power reset. For another example, the magnetic reset switch 27 is a reed switch. As shown in FIG. 4, the external magnetic object M may drive, in multiple manners, the magnetic reset switch 27 to sense the magnetism, for example, horizontal drive (the magnetic object M moves along a X axis to approach the magnetic reset switch 27), vertical drive (the magnetic object M moves along a Y axis to approach the magnetic reset switch 27), or rotation drive (the magnetic object M approaches the magnetic reset switch 27 and rotates about a center thereof used as an axis).

In summary, when the image capturing device 1 in the embodiments of the present invention cannot normally operate or gives no response, the camera 20 can be moved to make the magnetic reset switch 27 approach the first magnetic member 12 of the fixed base 10, or the external magnetic object is used to approach the magnetic reset switch 27, so that the magnetic reset switch 27 senses the magnetism, to perform power reset. The housing 21 does not need to be dismantled, or a hole does not need to be formed on the housing 21 for power rest function, thereby avoiding damage to a part or a function of a product. For example, a waterproof coating is damaged because the housing 21 is dismantled or another hole (for example, a noise reduction hole or a microphone hole) is incorrectly inserted. In addition, by performing power reset as mentioned above, the efficiency can also be improved, and the present disclosure can be applicable to the sealed image capturing device 1.

As further shown in FIG. 2, in an embodiment, a surface of the housing 21 has a sensing area, the magnetic reset switch 27 is disposed correspondingly to the sensing area, and the sensing area has a marker 212 disposed therein. The marker 212 is used to explicitly indicate an accurate position of the magnetic reset switch 27 inside the housing 21. When the user wants to perform power reset, the user can make the marker 212 approach the magnetic object, so that the magnetic reset switch 27 senses the magnetism. In this embodiment, the marker 212 is an indication word (for example, the word RESET in FIG. 2) that is formed on the surface of the housing 21 in a printing manner. In different embodiments, the marker 212 may alternatively be a reticle, a marking point, an indication symbol, or an indication pattern. Alternatively, the marker 212 may be a structure, for example, a convex point, a convex bar, or a groove, and this is not limited in the present invention.

In the embodiment of FIG. 6, the camera 20 may be provided with a transmission line 26 that is connected between the camera 20 and the fixed base 10, to perform data transmission or electricity transmission. For example, the transmission line 26 may be connected to a monitoring system, to transmit an image captured by the camera 20, or the transmission line 26 may be connected to an external power source for electricity transmission. In this embodiment, the magnetic reset switch 27 and the transmission line 26 are located on the same side of the camera 20, for example, located on an upper side of the camera 20. In addition, compared with a position on the housing 21 where the transmission line 26 is connected to, the magnetic reset switch 27 is disposed more distant from the second assembly portion 22. Therefore, a part of the transmission line 26 is located between the spherical convex 221 and the sensing area on the surface of the housing 21. In an embodiment, when the user rotates the camera 20 upward to a particular position relative to the fixed base 10 to adjust the shooting angle of the camera 20, because the transmission line 26 is located between the spherical convex 221 and the sensing area on the surface of the housing 21, the transmission line 26 may be abutted on the fixed base 10 to provide a stopping function, such that the magnetic reset switch 27 is prevented from entering the range of the magnetic field of the first magnetic member 12 to mistakenly perform power reset.

Figure 7:
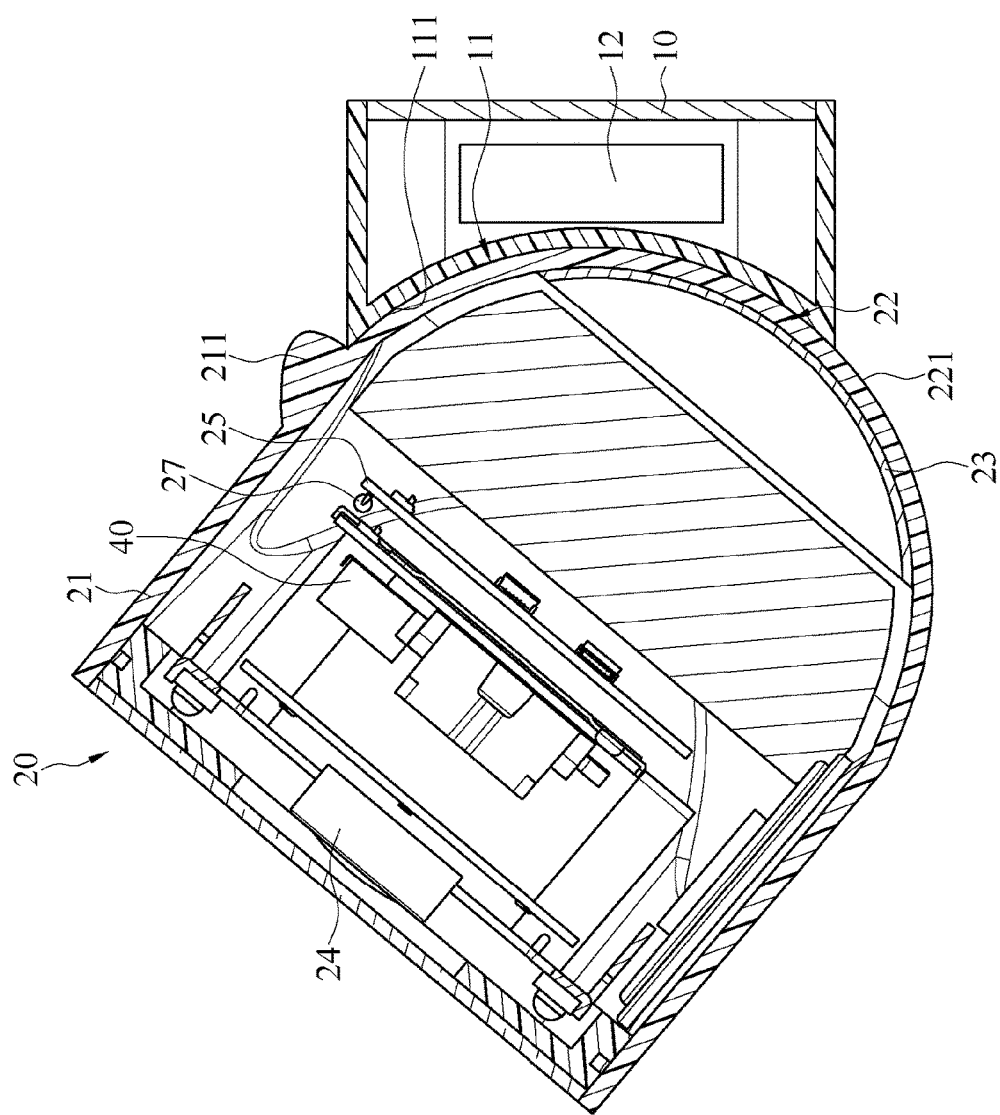
FIG. 7 is a sectional view of the image capturing device in use for angle adjustment according to another embodiment of the present invention.

In an embodiment, the housing 21 has a stopping member 211 protruding from the surface of the housing 21. Compared with the stopping member 211, the magnetic reset switch 27 is disposed more distant from the second assembly portion 22. When the user moves or rotates the camera 20 to the particular position relative to the fixed base 10 to adjust the shooting angle of the camera 20 or to make the magnetic reset switch 27 approach the first magnetic member 12, the stopping member 211 may be abutted on the fixed base 10 to provide a stopping function, such that the magnetic reset switch 27 is prevented from entering the range of the magnetic field of the first magnetic member 12 to mistakenly perform power reset. For example, in an embodiment of FIG. 7, which is a sectional view of the image capturing device in use for angle adjustment according to another embodiment of the present invention, the stopping member 211 is a projection disposed on the surface of the housing 21, and the stopping member 211 is located between the spherical convex 221 and the sensing area on the surface of the housing 21, and the present implementation of the stopping member 211 is not limited thereto.

Figure 8:
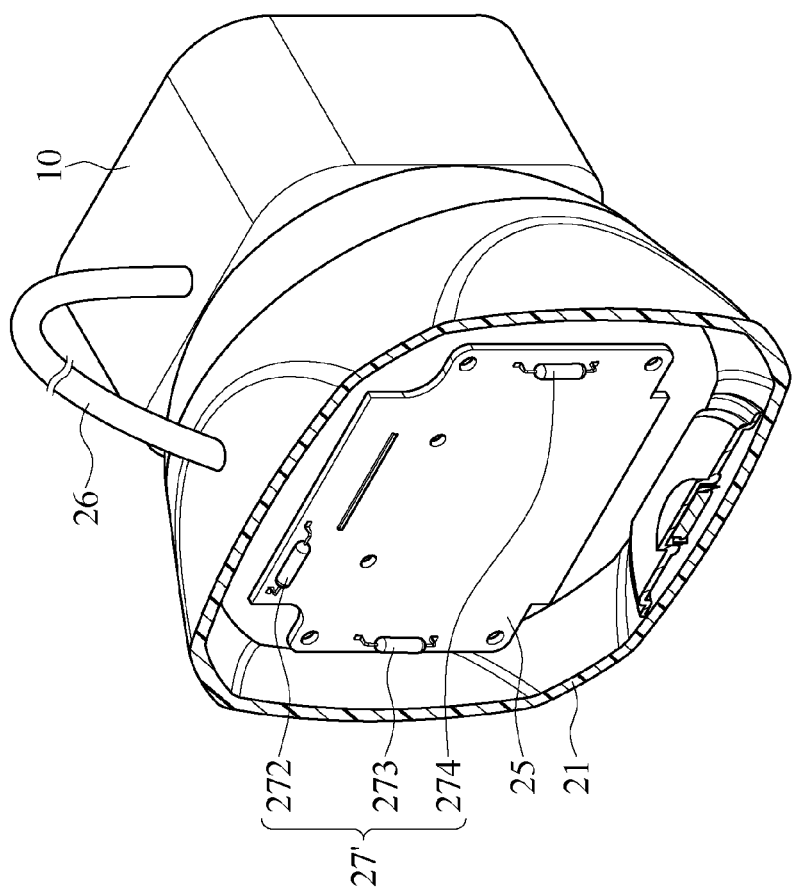
FIG. 8 is a sectional view of the image capturing device according to a second embodiment of the present invention.

In an embodiment, a magnetic reset switch 27' may include at least two magnetic sensing elements. For example, as shown in FIG. 8, FIG. 8 is a sectional view of the image capturing device according to a second embodiment of the present invention. Compared with the first embodiment, in this embodiment, the magnetic reset switch 27' includes three magnetic sensing elements 272, 273, and 274 that are respectively located on different sides of the camera 20. Each of the magnetic sensing elements 272, 273, and 274 may be a reed switch or a magnetic induction switch. The user may move the camera 20 to drive the three magnetic sensing elements 272, 273, and 274 to approach the first magnetic member 12 respectively, or the user can use an external magnetic object to approach the three magnetic sensing elements 272, 273, and 274 respectively, to make the three magnetic sensing elements 272, 273, and 274 sense magnetism sequentially. The camera 20 may not correspondingly perform power reset until the three magnetic sensing elements 272, 273, and 274 sense the magnetism sequentially. Compared with the manner in which only one magnetic reset switch 27 is disposed on the camera 20, this manner can prevent an intended person from easily performing power reset or prevent the user from mistakenly performing power reset.

In an embodiment, the image capturing device 1 may further include other type of magnetic switch. For example, in an embodiment of FIG. 9, which is a sectional view of the image capturing device according to a third embodiment of the present invention, the image capturing device 1 may include a magnetic alarm switch 28, and the magnetic alarm switch 28 is disposed approximal to the second assembly portion 22 of the housing 21. The magnetic alarm switch 28 may be a reed switch or a magnetic induction switch, and can sense the magnetism of the first magnetic member 12. When the magnetic alarm switch 28 is distant from the first magnetic member 12, for example, when the magnetic alarm switch 28 is outside the range of the magnetic field of the first magnetic member 12 because the camera 20 is separated from the fixed base 10, the magnetic alarm switch 28 immediately outputs an alarm signal and further has a security function. For example, the alarm signal may correspondingly drive an alerter to make a sound or notify a remote security system, to prevent the camera 20 from being stolen. In another embodiment, the magnetic alarm switch 28 may alternatively be preset to output an alarm signal after the magnetic alarm switch 28 is distant from the first magnetic member 12 for a set time (for example, 5 minutes, 10 minutes, or 15 minutes), to avoid a situation in which the user moves the camera 20 to perform power reset (for example, as shown in FIG. 5).

Figure 9:
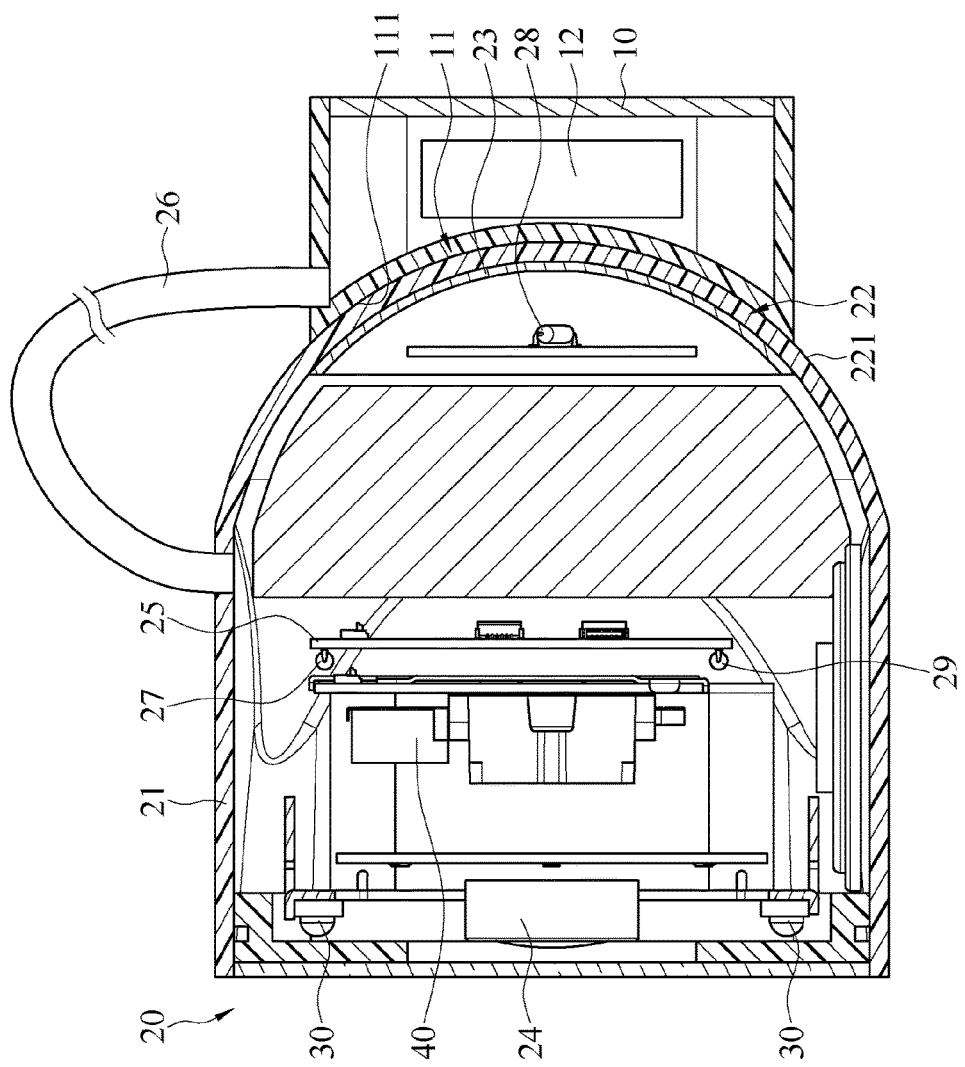
FIG. 9 is a sectional view of the image capturing device according to a third embodiment of the present invention.

In another embodiment, as shown in FIG. 9, the image capturing device 1 further includes an electronic element 30 (for example, an LED lamp) and a magnetic control switch 29 electrically connected to the circuit board 25. The user may move the camera 20 to make the magnetic control switch 29 approach the first magnetic member 12 to sense the magnetism, to control the operation of the electronic element 30. For example, when the magnetic control switch 29 senses the magnetism due to approaching the first magnetic member 12 or due to approaching of the external magnetic object, the magnetic control switch 29 may correspondingly control the electronic element 30 (for example, the LED lamp) to be turned on or turned off, or control the brightness of the electronic element 30. In alternative embodiments, the electronic element 30 may be a speaker or an electronic element having other function, and a volume or operation of the function can be controlled by using the magnetic control switch 29.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An image capturing device having a power reset function, comprising:
   a fixed base, having a first assembly portion, wherein the first assembly portion is provided with a first magnetic member; and
   a camera, comprising a housing, a circuit board, and a magnetic reset switch electrically connected to the circuit board, wherein the housing has a second assembly portion, and the second assembly portion is provided with a second magnetic member; the second magnetic member and the first magnetic member are configured to be magnetically attracted to each other such that the second assembly portion is correspondingly assembled and disposed on the first assembly portion; the circuit board is disposed inside the housing; the magnetic reset switch is disposed inside the housing and is distant from the second assembly portion.

2. The image capturing device having a power reset function according to claim 1, wherein the magnetic reset switch is a reed switch, the reed switch has two magnetic reeds that are spaced from each other, and when the reed switch approaches the first magnetic member of the fixed base to sense the magnetism, the two magnetic reeds come into conduction with each other to perform power reset.

3. The image capturing device having a power reset function according to claim 1, wherein the magnetic reset switch is a magnetic induction switch, and when the magnetic induction switch approaches the first magnetic member of the fixed base to sense the magnetism, the magnetic induction switch generates a sensed pulse signal to perform power reset.

4. The image capturing device having a power reset function according to claim 1, wherein the magnetic reset switch comprises at least two magnetic sensing elements, and power reset is performed only when the at least two magnetic sensing elements approach the first magnetic member of the fixed base and sequentially sense the magnetism.

5. The image capturing device having a power reset function according to claim 1, wherein the camera has a lens, the lens and the second assembly portion are respectively located on opposite sides of the camera, and the circuit board is disposed between the lens and the second assembly portion.

6. The image capturing device having a power reset function according to claim 1, wherein the first assembly portion and the second assembly portion are of corresponding shapes.

7. The image capturing device having a power reset function according to claim 6, wherein the first assembly portion of the fixed base has a spherical concave, the second assembly portion of the housing has a spherical convex, and the spherical convex and the spherical concave are of corresponding shapes and configured to be relatively rotated.

8. The image capturing device having a power reset function according to claim 7, wherein a section of the second magnetic member is of a circular arc shape, and the second magnetic member is correspondingly attached to the spherical convex.

9. The image capturing device having a power reset function according to claim 7, wherein a surface of the housing has a sensing area, the magnetic reset switch is disposed correspondingly to the sensing area, the housing has a stopping member protruding from a surface of the housing, the stopping member is located between the spherical convex and the sensing area.

10. The image capturing device having a power reset function according to claim 7, wherein a surface of the housing has a sensing area, the magnetic reset switch is disposed correspondingly to the sensing area, the camera is provided with a transmission line that is connected between the camera and the fixed base, the magnetic reset switch and the transmission line are located on the same side of the camera, a portion of the transmission line is located between the spherical convex and the sensing area.

11. The image capturing device having a power reset function according to claim 1, wherein a surface of the housing has a sensing area, the magnetic reset switch is disposed correspondingly to the sensing area, and the sensing area has a marker disposed therein.

12. The image capturing device having a power reset function according to claim 1, further comprising a magnetic alarm switch, wherein the magnetic alarm switch is disposed on the second assembly portion of the housing, and when the magnetic alarm switch is distant from the first magnetic member, the magnetic alarm switch outputs an alarm signal.

13. The image capturing device having a power reset function according to claim 1, further comprising an electronic element and a magnetic control switch electrically connected to the circuit board, and the camera can selectively move, to make the magnetic control switch approach the first magnetic member to sense the magnetism, and control operation of the electronic element.

* * * * *